UNITED STATES PATENT OFFICE.

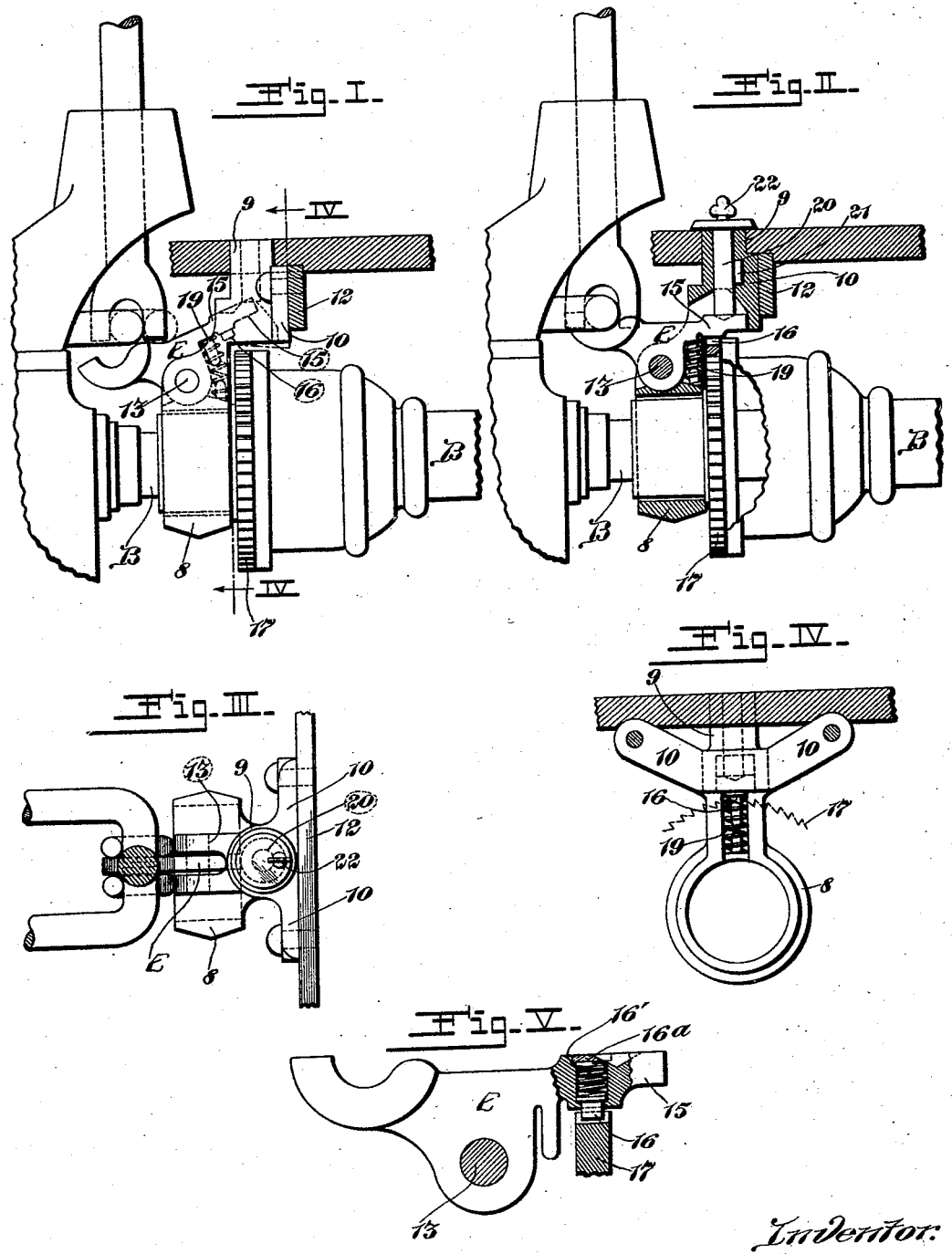

SHERMAN H. DORSEY, OF ST. LOUIS, MISSOURI, ASSIGNOR TO TRAFFIC MOTOR TRUCK CORPORATION, OF ST. LOUIS, MISSOURI, A CORPORATION OF NEW YORK.

AUTOMOBILE LOCK.

1,417,661. Specification of Letters Patent. Patented May 30, 1922.

Application filed April 7, 1919. Serial No. 288,203.

*To all whom it may concern:*

Be it known that I, SHERMAN H. DORSEY, a citizen of the United States of America, a resident of the city of St. Louis, in the State of Missouri, have invented certain new and useful Improvements in Automobile Locks, of which the following is a full, clear, and exact description, reference being had to the accompanying drawings, forming a part of this specification.

My invention relates to an automobile lock, and is in the nature of an improvement upon the automobile lock shown and described in the U. S. Letters Patent No. 1,267,887, issued May 28, 1918, to Harry P. Mammen. The construction shown and described in said patent provides among other things for locking the traction wheels of an automobile to prevent the vehicle from being towed when the lock is in service, and is such as to prevent either forward or backward movement of the vehicle, due to the drive shaft being held from rotation in either direction when the lock is in service. Therefore, while the lock serves to prevent towing of the vehicle, owing to the drive shaft and the traction wheels being held from movement, it also makes it impossible to move the vehicle backwardly, as is at times desirable. It not infrequently occurs that there is need for moving a locked automobile from one position to another, as, for example, on city streets in the event of a fire in the vicinity of the automobile, many cities having ordinances which prohibit the locking of an automobile in such manner that the vehicle may not be moved. The object of my invention is an improvement upon the hereinbefore mentioned patented automobile lock that will permit the desirable and frequently necessary backward movement of the locked vehicle, while at the same time retaining in the lock such operative construction that will prevent towing of the vehicle.

Fig. I is a side elevation of an automobile locking device having my improvement incorporated therein, the locking element being in inoperative position.

Fig. II is a view similar to Fig. I, partly in section, with the lock shown in operative position.

Fig. III is a plan view, partly in section, with the locking device in operative position.

Fig. IV is a vertical section taken approximately on line IV—IV, Fig. I, the drive shaft being omitted.

Fig. V is an elevation, partly in section, of the portions of the locking device with which my improvement is directly associated, and illustrating my improvement.

Inasmuch as the lock to which my improvement is applied, and the parts of an automobile with which said lock cooperates, are fully shown and described in the U. S. patent hereinbefore mentioned, it is deemed sufficient to describe herein only such parts of the automobile and the old locking device as are directly concerned in my improvement, and to set forth in connection therewith my improvement.

As in the hereinbefore mentioned patented structure, there is a latch holder comprising a ring 8 surrounding the drive shaft B, a tubular bolt-receiving member 9 carried by said ring, and wings 10 extending from the member 9, said wings being secured to a supporting bar 12.

E designates a latch device pivotally connected at 13 to the latch holder, and having a latch arm 15 contiguous to the tubular bolt-receiving member 9 of the latch holder.

17 designates a ratchet wheel fixed to the drive shaft B and relative to which the latch arm 15 is movable to permit of the locking element carried by said latch arm, and presently to be described, being adjusted into and out of engagement with said ratchet wheel. A spring 19 interposed between the ring 8 and the latch arm 15 serves to normally hold the latch device E in an inoperative position, as shown in Fig. I.

16 designates a locking dog loosely fitted to the latch arm 15, and 16′ is a spring above or back of said dog by which the dog is yieldably projected from the latch arm. The latch arm 15 contains a pocket within which the spring 16′ is confined, and the locking dog is preferably formed with a head located within said pocket, serving to hold the dog from displacement from the latch arm. Said pocket is closed at its upper or outer end in any suitable manner, as by the application of a plug 16ª.

The means for locking the latch device E in its operative position are similar to those shown in the aforementioned U. S. patent, and comprise a bolt 20 insertible into the bolt-receiving member 9 to engage the latch arm 15 and retain the latch device in operative position. A key 22, separable from the bolt 20, serves to operate a key-controlled lock including a member 21 by which the bolt 20 is held engaged with the member 9 and in engagement with the latch device E.

When the locking device containing my improvement is in service, the spring actuated locking dog 16 is held in engagement with and in front of a tooth of the ratchet wheel 17, and as the teeth of said ratchet wheel point in the direction of rotation of the drive shaft when the automobile is moving forwardly, it is impossible for said drive shaft to rotate in the direction necessary for forward movement of the automobile. The ratchet wheel may, however, be rotated in the opposite direction for the reason that the locking dog will escape from tooth to tooth of the ratchet wheel while said wheel is rotating in a retrograde direction, and consequently the drive shaft B may be rotated in a retrograde direction, as in backing the automobile, so that the vehicle may be moved backwardly to any desired degree.

I claim:

1. In a locking device for an automobile having a drive shaft for the transmission of power to its traction wheels, a rotary locking member driven by said drive shaft so as to turn in response to movements of said shaft and traction wheels, a yieldable dog cooperable with said rotary locking member to prevent rotation of said wheels in only one direction, and a lock whereby said yieldable dog is retained in yielding engagement with said rotary locking member, said yieldable dog being movable independently of said lock to permit movement of the automobile in one direction.

2. In a locking device for an automobile having a drive shaft for the transmission of power to its traction wheels, a ratchet wheel driven by said drive shaft so as to turn in response to movements of said drive shaft and traction wheels, a yieldingly mounted locking dog adapted to engage said ratchet wheel to prevent movement of the automobile in one direction, and a lock whereby said locking dog is retained in yielding engagement with said ratchet wheel, said locking dog being movable independently of said lock to permit movement of the vehicle in one direction.

3. In a locking device for an automobile having a drive shaft for the transmission of power to its traction wheels, a ratchet wheel driven by said drive shaft so as to turn in response to movements of said drive shaft and traction wheels, a latch member movable toward and away from said ratchet wheel, a locking dog in the form of a pawl yieldingly held by said latch member and adapted to engage said ratchet wheel to prevent movement of the automobile in one direction, and a key-controlled lock cooperating with said latch member to retain said locking dog in yielding engagement with said ratchet wheel, said locking dog being movable independently of said latch member to permit movement of the automobile in one direction.

4. In a locking device for an automobile having a drive shaft for the transmission of power to its traction wheels, a ratchet wheel fixed to said drive shaft so as to turn with said drive shaft and traction wheels, a latch arm movable toward and away from the teeth of said ratchet wheel, a spring-pressed locking dog carried by said latch arm and adapted to engage said teeth to prevent movement of the automobile in only one direction, and a key-controlled lock cooperating with said latch arm to retain said spring-pressed locking dog in engagement with the teeth of said ratchet wheel, said locking dog being movable independently of said latch arm to permit movement of the automobile in one direction.

In testimony that I claim the foregoing I hereunto affix my signature.

SHERMAN H. DORSEY.